United States Patent [19]

Kennedy

[11] 4,129,637

[45] Dec. 12, 1978

[54] USE OF AN OPEN POROUS THERMOPLASTIC NETTING AS THE LAMINATING ADHESIVE IN FORMING A MINERAL WOOL FIBERBOARD PRODUCT

[75] Inventor: Wayne C. Kennedy, Lititz, Pa.

[73] Assignee: Armstrong Cork Company, Lancaster, Pa.

[21] Appl. No.: 804,704

[22] Filed: Jun. 8, 1977

[51] Int. Cl.² .............................................. B04H 1/20
[52] U.S. Cl. .................................. 264/112; 264/121; 264/122; 264/248; 264/257
[58] Field of Search ............... 264/112, 121, 122, 248, 264/257

[56] References Cited

U.S. PATENT DOCUMENTS

| 2,592,521 | 4/1952 | Thompson | 264/121 |
| 3,056,005 | 9/1962 | Larson | 264/257 |
| 3,356,780 | 12/1967 | Cole | 264/119 |

Primary Examiner—Robert F. White
Assistant Examiner—James R. Hall

[57] ABSTRACT

An apparatus for forming a mineral wool fiberboard product is described in copending application, Ser. No. 780,419, filed Mar. 23, 1977. This invention constitutes an improvement thereover in that an open porous thermoplastic netting is utilized as the laminating adhesive for bonding the open mesh glass fabric to the mineral wool fiberboard. The thermoplastic netting is fed into the forming chamber immediately over the open mesh glass fabric and beneath the layer of fibers and resins being formed thereover.

4 Claims, 1 Drawing Figure

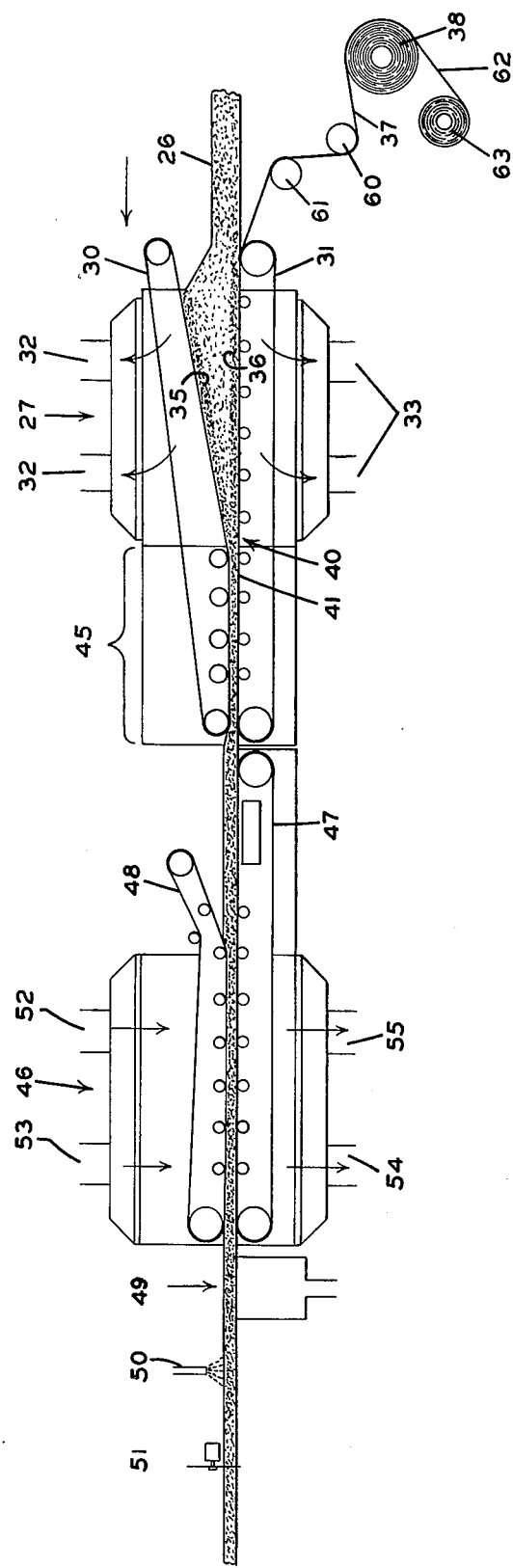

USE OF AN OPEN POROUS THERMOPLASTIC NETTING AS THE LAMINATING ADHESIVE IN FORMING A MINERAL WOOL FIBERBOARD PRODUCT

CROSS REFERENCE TO RELATED APPLICATION

This application relates to an improvement in the method for forming a mineral wool fiberboard product as described in U.S. application, Ser. No. 780,419, filed Mar. 23, 1977, which application is incorporated herein by reference.

BACKGROUND OF THE INVENTION

1. Field of the Invention

The field of the invention relates to a dry lay process for forming a mineral wool fiberboard product from an intimate mixture of mineral wool fibers and thermosetting powdered binder entrained in an air stream which is exhausted through the lower and upper forming wires in a forming zone.

2. Description of the Prior Art

Low-density fiberboard products having excellent acoustical properties are readily available. Generally speaking, air laid products are formed from an intimate mixture of glass fibers and thermosetting resinous binders. However, although slurry board forming processes for manufacturing satisfactory low-density good acoustical fiberboard products from shorter mineral wool fibers are known, such shorter fibers present several problems relative to satisfactory mat and board formation using dry laid systems. Typical of the prior art in this field are U.S. Pat. Nos. 2,589,008; 3,356,780; 2,188,373; and 2,012, 805.

SUMMARY OF THE INVENTION

This invention relates to the process which is more fully disclosed in copending U.S. application, Ser. No. 780,419, filed Mar. 23, 1977. This method of formation takes advantage of the desirability of having an alternate fiber source for forming dry laid acoustical boards having good physical and acoustical properties from mixtures of fibers and resinous binder wherein the fibers utilized are mineral wool fibers, usually produced as a by-product of steel manufacture from slag, as a replacement for the more common longer glass fibers. A special apparatus for forming the desired mineral fiberboard product is disclosed in said copending application, and this invention relates to an improvement in the process in which such apparatus is utilized in forming the desired product. Namely, the improvement comprises utilizing an open porous thermoplastic netting as a laminating adhesive in forming a glass fabric faced dry laid mineral wool board.

BRIEF DESCRIPTION OF THE DRAWING

The FIGURE diagrammatically illustrates the apparatus and process whereby mineral wool fibers are intimately mixed with powdered binder and formed into a fiberboard product, utilizing an open mesh glass fabric as the carrier for the fibers and resin binder during board formation and ultimately as the facing layer in the final board product. As illustrated, the improvement comprises feeding a porous thermoplastic netting over the glass fabric into the forming chamber.

DESCRIPTION OF THE PREFERRED EMBODIMENT

As stated herein above, this invention is concerned with an improvement in the process disclosed in copending application, Ser. No. 780,419, filed Mar. 23, 1977. That portion of the apparatus in which the improvement is utilized includes the board-forming chamber and the curing oven portion of the apparatus. With reference to the drawing, fibers and binder are entrained in an enclosed air stream and then directed into the board-forming chamber. The board-forming chamber consists of two driven endless forming wires, the upper wire forming the collection means of which one layer of fibers and binder is deposited, and the lower-forming wire forming the second collection means on which a second layer of fibers and binder is deposited, with the wires being trained to converge at a nip opening whereby both layers of fibers and binder are consolidated. Vacuum means are positioned above the upper wire and below the lower wire whereby air is withdrawn from the air stream carrying the fibers and binder, thus depositing said fibers and binder as the upper and lower layers which are finally consolidated into the board-forming mat. After exiting from the nip opening formed between the upper and lower belts, the board-forming mat is carried through an oven by means of a lower foraminous driven belt and an upper foraminous driven belt, which belts engage the board-forming mat to compress it while heated air passes therethrough to set the binder material.

An open mesh glass fabric is introduced over the lower forming wire or belt prior to deposition of fibers and resin from the air stream. In the copending application, a liquid binder was applied to the fabric prior to introduction into the forming chamber to form a better bond between the mat and the fibers formed thereover. The use of the open mesh glass fiber mat resulted in two distinct advantages in processing, namely, it acted as a carrier for the board-forming mat throughout the several stages in the process and also performed as a decorative surface which was integrally bonded to the board during the board formation stage.

The use of a liquid binder has presented several problems, including waste of liquid adhesive as well as problems with cleaning and maintenance of the applicator roll used to apply the liquid adhesive. In addition, problems with delamination occurred.

This improvement as shown in the drawing comprises introducing a porous thermoplastic netting over the open mesh glass fabric prior to entry into the forming chamber. The thermoplastic netting has an open porous structure such that air flow during the forming stages is not impeded. The thermoplastic netting also has a melting point below the oven curing temperature required for setting the resin binder in the mineral fiberboard product.

With reference to the drawing for ease of incorporation by reference, an identical numbering system is used as that used in the copending application. Processing proceeds from right to left in the figure.

With reference to the drawing, mineral wool fibers and a granular powdered binder are entrained in the air infeed in duct 26 leading into the evacuated forming chamber 27. The entrained fibers and resin in the air stream in duct 26 pass into the forming chamber 27. This air stream is created by the vacuum established in the enclosed areas behind the upper driven forming wire 30 and the lower driven forming wire 31. Fans, not shown, evacuate the air through ducts 32 at the top of the forming chamber 27 and ducts 33 at the bottom of forming chamber 27. Means, also not shown, control the velocity of the air stream such that the amounts of resin and fiber, as well as fiber types, can be classified as the fiber-resin mats 35 and 36 are being built up on the forming wires 30 and 31.

The open mesh glass fabric 37, which does not impede air flow, is fed from an unwind stand 38 under a tension roll 60 over a mount hope roll 61 and then over the lower forming wire 31 at a point just prior to mat buildup. A porous open mesh thermoplastic netting 62 is fed from unwind stand 63 over the top of the glass fabric, underneath the tensioning roll, and then over the mount hope roll and onto the forming wire 31 at a point just prior to the mat buildup. Mats 35 and 36 are consolidated onto the thermoplastic netting 62 and the fabric 37 and to each other at the nip opening 40 formed by the converging forming wires 30 and 31, the open mesh glass fabric and the open mesh plastic netting serving as a carrier during the process into the oven area. The mat is further consolidated in zone 45 and further consolidation occurs in oven 46.

A lower driven metal mesh belt 47 and upper driven metal mesh belt 48 convey the glass fabric and the plastic netting with the overlying board-forming mat into and through oven 46. In oven 46, the thermosetting resin-containing mineral wool mat is cured under compression to form the acoustical insulating board and the thermoplastic open mesh netting melts to form an adhesive bond which secures the compressed acoustical insulating board to the open mesh glass fabric facing. The integrated board structure is cooled at 49, has paint applied at 50, and is cut to size at cut-off saw 51. Recirculated heated air is supplied to oven 46 through upper ducts 52 and 53 and removed through lower ducts 54 and 55.

EXAMPLE

An intimate mixture of mineral wool and a powdered thermosetting one-step phenol formaldehyde resole resin (Durez 24652) is fed at a rate of about 29.9 pounds per minute (13.6 kilograms per minute) for the mineral fibers and a rate of 5.3 pounds per minute (2.4 kilograms per minute) for the resin into the enclosed duct 26. The line speed established at these rates of feed is about 75 inches per minute (1.9 meter per minute).

The air entering through duct 28 in which the fibers and resin are entrained is at a velocity of about 4,000 cubic feet per minute (113.2 cubic meters per minute). At the entrance to the forming chamber 27, the velocity of the air stream is about 11,000 cubic feet per minute (311.4 cubic meters per minute). The velocity of the air passing through the upper forming wire 30 is about 4,000 cubic feet per minute (113.3 cubic meters per minute) and through the lower forming wire, about 7,000 cubic feet per minute (198.2 cubic meters per minute). The air stream passing into the forming chamber 27 and through the forming wires 30 and 31 acts as a classifier, such that the finer fibers initially build up first on the wires with the coarser fibers building up thereover. The two mats of fiber and resin built up on the forming wires are then consolidated into a unitary board forming mat 41 about 52 inches (81 centimeters) wide at the nip opening 40 formed by the converging forming wires and further consolidated in zone 45.

The open mesh glass fabric 37 is drawn off an unwind stand 38 and a thermoplastic extruded film which has been embossed and oriented to give an open mesh porous netting 62 is drawn off unwind stand 63 over the fabric coming off unwind stand 38. The two layers 37 and 62 are led under tension roll 60, over the mount hope roll 61 and then over the lower wire screen 31.

A suitable glass fabric utilized in this example is a J. P. Stevens Style 1635-52"-O-MC weighing 3.95 ounces per square yard. The open mesh thermoplastic netting is a high density polyethylene extruded film which has been embossed and oriented to give porous open mesh netting. It is produced by Hercules Incorporated under the trademark Delnet X-230 and weighs 0.52 ounces (14.7 grams) per square yard. Neither the open mesh glass fabric 37 nor the open mesh thermoplastic netting 62 impedes air flow during mat buildup.

The consolidated board forming mat with the glass cloth and thermoplastic netting fabric layer is then carried through the oven 46 by the driven metal mesh belt 47 and is further consolidated during resin cure by the driven metal mesh belt 48. The oven temperature is about 350° F., although heated air at between 300° and 400° F. could be passed through the board to effect cure, the temperature being related to line speed and board thickness. During board curing, the thermoplastic open mesh netting melts to form an adhesive layer whereby the open mesh glass fabric facing layer is securely adhered to the board.

After exiting from the oven 46, the board is cooled at 49 by passing cooling air therethrough, back painted at 50 and cut to size at 51.

The above process forms a 2-inch (5.1 centimeter) thick board having a glass fabric facing and a density of about 0.65 pounds per board foot (124 kilograms per cubic meter). As measured by Federal Specification PBS-C.2, it has an 18 to 19 N.I.C. (noise isolation class) and a noise reduction coefficient of about 90.

The N.I.C. of the board can be raised to 20 and its noise reduction coefficient to 95 by raising the velocity of the air through the top wire 30 in the forming chamber to 8,000 cubic feet per minute (226.5 cubic meters per minute) and by lowering the air velocity through the bottom wire 31 to 3,000 cubic feet per minute (84.9 cubic meters per minute).

Hercules provides a number of open mesh thermoplastic nettings which are formed of an extruded film, which in turn is passed through an engraving roll to form openings therein and to orient the film. Most are of high density polyethylene, although some are of polypropylene. It will be obvious to one skilled in the art that any open mesh thermoplastic netting material which will not impede air flow during the board forming operation and which in turn will melt to form an adhesive layer during the cure cycle in the oven would work equally as well. Generally speaking, the mass or weight of the fabric should be between about ½ ounce per square yard to 1 ounce per square yard (14.15 grams to 28.3 grams) in order to form an adequate bond without wasting excessive material.

Utilizing a 90° peel test, the peel strength measured for boards produced in accordance with this invention ranged between about 170 to 350 grams with a nominal reading of 250 grams. This compared with a liquid adhesive system, such as that disclosed in the copending application, which only yielded nominal 100 grams peels using the 90° peel test. The 90° peel test measures the weight (in grams) required to cause delamination between the fabric facing and the fiberboard.

What is claimed is:

1. In a method of manufacturing a dry laid mineral wool fiberboard product faced with an open mesh glass fabric wherein fibers and resin binder forming the board product are entrained in an air stream and deposited on two converging forming wires and wherein an open mesh glass fabric is positioned between the lower forming wire and the layer of fibers and resin binder being formed thereover, with the fabric acting as a carrier which becomes adhered to the mineral wool fiberboard after consolidation of the two layers of fibers and resin binder and during oven cure of the resin binder, the improvement comprising: feeding an open weave thermoplastic netting between the open mesh glass fabric and the fibers and resin binder being formed thereover, said thermoplastic netting being of an open porous structure such that air flow through the fabric and netting during the forming operation is not impeded, said netting having a melting point below the oven curing temperature required for curing the resin binder in the mineral fiberboard whereby during the oven cure the netting melts and forms, on cooling, an adhesive bond between the glass fabric facing and the fiberboard.

2. The method in accordance with claim 1 wherein said thermoplastic netting is selected from the group consisting of polyethylene and polypropylene.

3. The method in accordance with claim 2 wherein the weight of the thermoplastic netting is ½ ounce per square yard to 1 ounce per square yard.

4. The method in accordance with claim 1 wherein the weight of the thermoplastic netting is ½ ounce per square yard to 1 ounce per square yard.